United States Patent
Himuro

Patent Number: 5,967,210
Date of Patent: *Oct. 19, 1999

[54] PNEUMATIC TIRES HAVING AN ASYMMETRIC DIRECTIONAL PATTERN

[75] Inventor: Yasuo Himuro, Tachikawa, Japan

[73] Assignee: Bridgestone Corporation, Tokyo, Japan

[*] Notice: This patent is subject to a terminal disclaimer.

[21] Appl. No.: 08/859,076

[22] Filed: May 20, 1997

[30] Foreign Application Priority Data

May 20, 1996 [JP] Japan ................................. 8-125116

[51] Int. Cl.⁶ ........................ B60C 11/03; B60C 111/00; B60C 115/00
[52] U.S. Cl. .................................. 152/209 A; 152/209 D
[58] Field of Search ........................... 152/209 R, 209 D, 152/209 A; D12/147

[56] References Cited

U.S. PATENT DOCUMENTS

| | | | |
|---|---|---|---|
| D. 380,426 | 7/1997 | Johenning et al. | D12/147 |
| D. 389,792 | 1/1998 | Himuro | D12/147 |
| 4,057,089 | 11/1977 | Johannsen | 152/209 R |
| 4,953,604 | 9/1990 | Shepler et al. | 152/209 A |
| 4,962,801 | 10/1990 | Tsuda | 152/209 R |
| 5,152,854 | 10/1992 | Matsumoto | 152/209 R |

FOREIGN PATENT DOCUMENTS

| | | | |
|---|---|---|---|
| 722851 | 7/1996 | European Pat. Off. | 152/209 R |
| 3815829 | 12/1988 | Germany | 152/209 A |
| 61-98601 | 5/1986 | Japan . | |
| 63-61607 | 3/1988 | Japan . | |
| 64-52507 | 2/1989 | Japan . | |
| 1-136801 | 5/1989 | Japan | 152/209 R |
| 2-31987 | 2/1990 | Japan | 152/209 R |
| 5-178023 | 7/1993 | Japan | 152/209 D |
| 6-127218 | 5/1994 | Japan | 152/209 R |

OTHER PUBLICATIONS

Blow, Rubber Technology and Manufacture, pp. 349–356, 1971.

Primary Examiner—Steven D. Maki
Attorney, Agent, or Firm—Sughrue, Mion, Zinn, Macpeak & Seas, PLLC

[57] ABSTRACT

A pneumatic tire having an excellent steering stability on wet road surface comprises a tread having an asymmetric directional tread pattern defined by steeply slant grooves and gently slant grooves arranged on at least both side regions, in which so-called directional tread pattern defining a rotating direction (normal rotating direction) of the tire in the mounting of the tire on a vehicle is formed by the steeply slant grooves to contact a side of the groove near to the central region with ground ahead and contact a side apart from the central region with ground afterward. The tread pattern also has gently slant grooves to contact a side of the groove opening to one of tread ends with ground ahead and contact a side of the groove opening to the other tread end with ground afterward.

8 Claims, 6 Drawing Sheets

FIG. 1

FIG_2

FIG_3a

FIG_3b

FIG_3c

FIG_4a

FIG_4b

FIG_4c

FIG_5
PRIOR ART

PNEUMATIC TIRES HAVING AN ASYMMETRIC DIRECTIONAL PATTERN

BACKGROUND OF THE INVENTION

1. Field of the Invention

This invention relates to a pneumatic tire, and more particularly to a pneumatic racing tire having an asymmetric directional tread pattern.

2. Description of Related Art

Figure 5:
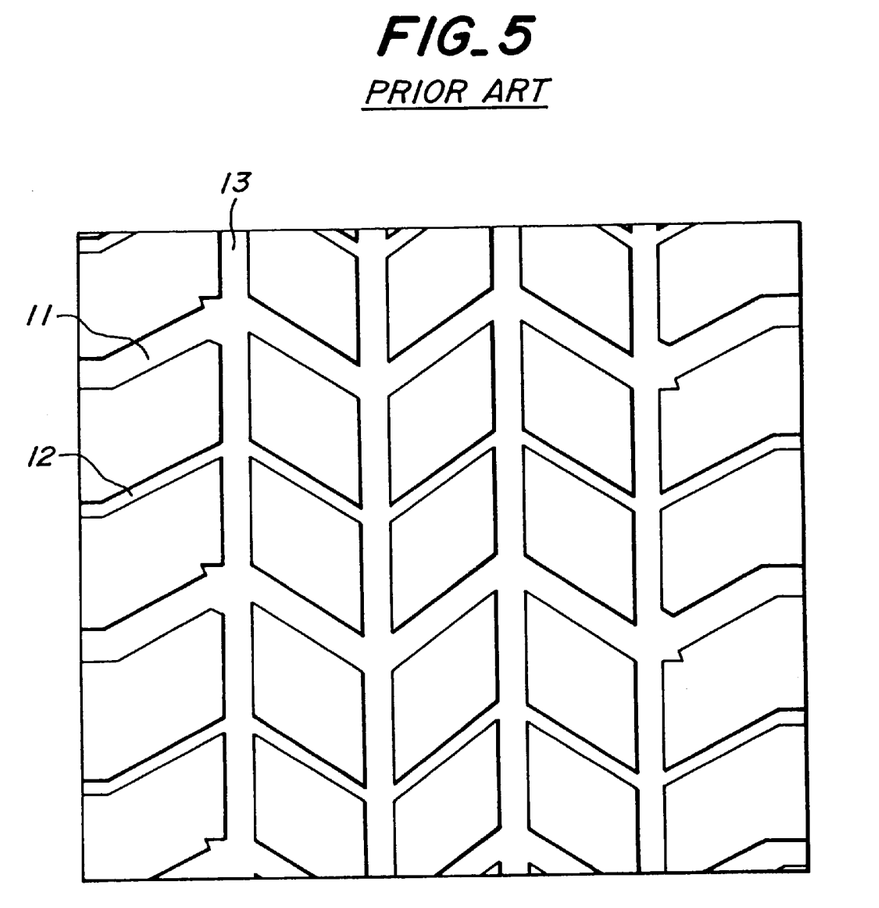
FIG. 5 is a partially enlarged front view of an embodiment of the tread pattern in the conventional pneumatic tire.
Figure 6:
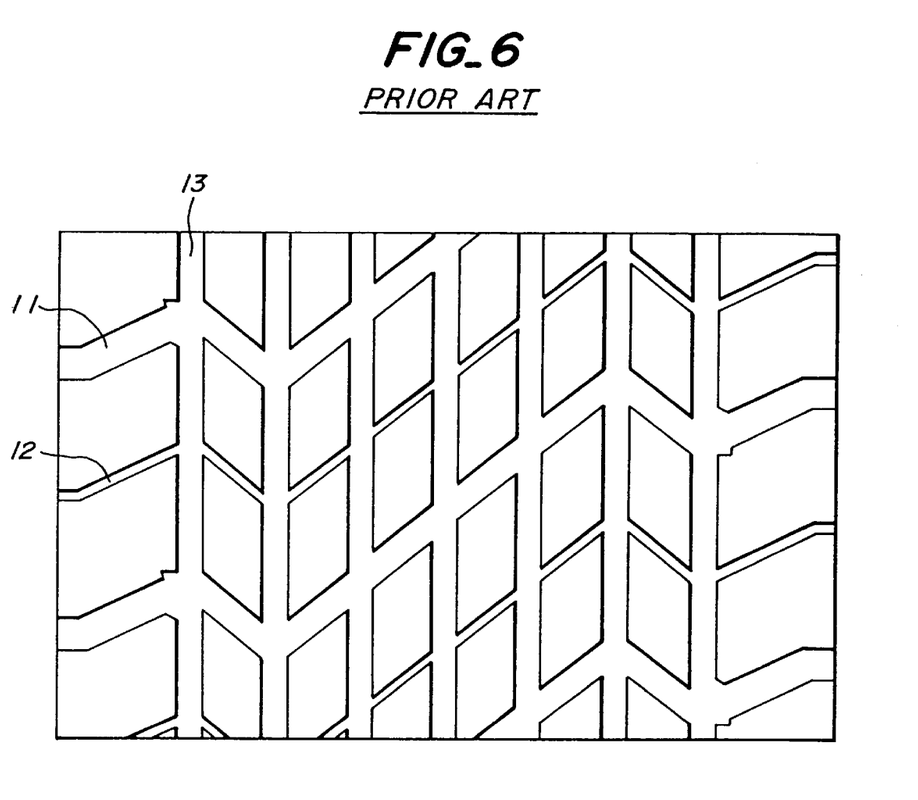
FIG. 6 is a partially enlarged front view of another embodiment of the tread pattern in the conventional pneumatic tire.

As shown in FIGS. 5 and 6, the well-known pneumatic racing tire had a tread pattern in which a tread is divided by a plurality of circumferential grooves extending straightforward in a circumferential direction of the tire and a plurality of slant grooves extending an inclination angle of 45 degree with respect to the circumferential direction into a plurality of blocks arranged at intervals in the circumferential direction.

SUMMARY OF THE INVENTION

It is an object of the invention to provide a pneumatic racing tire having further improved wet performance as compared with those of the conventional pneumatic racing tire, particularly excellent steering stability on wet road surface and drainage performance in cornering when the tire is run on the wet road surface.

According to the invention, there is the provision of in a pneumatic racing tire having an asymmetric directional tread pattern in which a tread is constituted with a central region having a width corresponding to about ⅒–⅓ of a tread width and side regions located at both sides of the central region and a plurality of blocks are formed in a tread at intervals in a circumferential direction of the tire by plural kinds of slant grooves arranged on at least these side regions at intervals in the circumferential direction of the tire, the improvement wherein (1) these slant grooves comprise steeply slant grooves each extending at a relatively small inclination angle with respect to the circumferential direction and gently slant grooves each extending at a relatively large inclination angle with respect to the circumferential direction, (2) the steeply slant grooves are arranged on both side regions and are steeply directional slant grooves extending left and right in herringbone form with the central region between and opening to both ends of the tread, (3) the steeply directional slant grooves form so-called directional tread pattern defining a rotating direction (normal rotating direction) of the tire in the mounting of the tire on a vehicle so as to contact a side of the steeply directional slant groove near to the central region with ground ahead and contact a side apart from the central region with ground afterward, and (4) the gently slant grooves are asymmetrically arranged on at least both side regions with respect to a pattern center and extend from one of both tread ends or the vicinity thereof toward the other tread end while gradually increasing the inclination angle with respect to the circumferential direction and open to the other tread end.

The term "steeply directional slant grooves extending in herringbone form" used herein means grooves inclining with respect to the circumferential direction and extending left and right with the central region between, or grooves forming so-called directional pattern defining a rotating direction (normal rotating direction) of the tire in the mounting of the tire on a vehicle to contact a portion of the groove near the tread end with ground afterward.

In a preferable embodiment of the invention, the gently slant grooves form a so-called directional tread pattern defining a rotating direction (normal rotating direction) of the tire in the mounting of the tire on a vehicle to contact a side of the gently slant groove having a small inclination angle with respect to the circumferential direction with ground ahead and contact a side of the gently slant groove having a large inclination angle with respect to the circumferential direction with ground afterward.

In another preferable embodiment of the invention, the steeply slant groove extends at an inclination angle of 5–35 degree, preferably 10–30 degree with respect to the circumferential direction, and the steeply slant grooves extend in the herringbone form with the central region between while gradually increasing the inclination angle with respect to the circumferential direction toward the tread end, and the steeply slant grooves extend in the herringbone form with the central region between while gradually increasing a groove width toward the tread end.

In the other preferable embodiments of the invention, the gently slant groove extends at an inclination angle of not less than 45 degree but less than 90 degree with respect to the circumferential direction, and the gently slant groove extends from one of both tread ends or the vicinity thereof toward the other tread end while gradually increasing both the inclination angle with respect to the circumferential direction and the groove width, and the gently slant groove is arranged in the central region and both side regions and continuously extends from one of both tread ends or the vicinity thereof toward the other tread end while gradually increasing the inclination angle with respect to the circumferential direction.

In further preferable embodiments of the invention, 1–4 circumferential grooves extending in the circumferential direction or substantially continuously in the circumferential direction are arranged in the central region.

In still further preferable embodiments of the invention, when the pneumatic tire according to the invention is mounted on a racing car, these tires are symmetrically mounted on left and right sides of the vehicle so that the inclination angle of the gently slant groove with respect to the circumferential direction is gradually increased from a tread end located in the inside of the vehicle or the vicinity thereof toward the other tread end or the inclination angle of the gently slant groove with respect to the circumferential direction is gradually increased from a tread end located in the outside of the vehicle or the vicinity thereof toward the other tread end in accordance with suspension properties and the like of the vehicle.

BRIEF DESCRIPTION OF THE DRAWINGS

The invention will be described with reference to the accompanying drawings, wherein.

DESCRIPTION OF THE PREFERRED EMBODIMENTS

In the pneumatic tire of the above construction according to the invention, the steeply slant grooves each extending at a relatively small inclination angle with respect to the circumferential direction are arranged in both side regions of the tread as steeply directional slant grooves extending left and right in the herringbone form with the central region between and opening to the tread end, and the directional tread pattern defining the rotating direction (normal rotating direction) of the tire in the mounting of the tire on the vehicle is formed by these steeply directional slant grooves so that the side of the groove near to the central region of the tread contacts with ground ahead and the side of the groove apart from the central region contacts with ground afterward, whereby there are obtained pneumatic racing tires having excellent straight running performance on wet road surface and drainage performance in the cornering.

Since the steeply slant grooves extend left and right in the herringbone form with the central region between, even in straight running and cornering, stable drainage performance can be obtained without being affected by the change of ground contacting shape.

Further, the inclination angle of the steeply slant groove with respect to the circumferential direction is preferably within a range of 5–35 degrees, more particularly 10–30 degrees, which corresponds with water flowing direction at the ground contacting area of the tire. If the inclination angle is outside the above range, the extending direction of the steeply slant groove is different from the water flowing direction, so that the drainage performance is undesirably degraded.

The drainage performance is further improved when the steeply slant grooves extend left and right in the herringbone form with the central region between while gradually increasing the inclination angle of the groove with respect to the circumferential direction toward the tread end.

Moreover, drainage performance in the lateral direction is enhanced when the steeply slant grooves extend left and right in the herringbone form with the central region between while gradually increasing the groove width toward the tread end.

On the other hand, the gently slant grooves having a relatively large inclination angle with respect to the circumferential direction are arranged on at least both side regions while gradually increasing the inclination angle with respect to the circumferential direction from one of both tread ends or the vicinity thereof toward the other tread end and opening to the other tread end and particularly so-called directional tread pattern defining the rotating direction (normal rotating direction) of the tire in the mounting of the tire on the vehicle is formed by these gently slant grooves so that the side of the groove having a smaller inclination angle with respect to the circumferential direction contact with ground ahead and the side of the groove having a larger inclination angle with respect to the circumferential direction contacts with ground afterward, whereby there are obtained pneumatic racing tires having an improved drainage performance.

In general, the ground contacting shape of the tire becomes asymmetric with respect to an equatorial plane of the tire due to the change of loading in the cornering. Furthermore, the asymmetrically ground contacting shape differs left and right in accordance with suspension property and the like of the racing car to be mounted with the tire. The ground contacting behaviors between a racing car having a suspension for general-purpose passenger car and a formula racing car having a special suspension are opposite to each other. That is, in the former case, the ground contacting shape of the tire mounted on the vehicle becomes long in the longitudinal direction at a side corresponding to the outside of the vehicle and short in the longitudinal direction at a side corresponding to the inside of the vehicle, while in the latter case, the ground contacting shape of the tire is quite contrary to that of the former case.

Under the above circumstances, when the pneumatic tire according to the invention is mounted on a racing car, these tires may symmetrically be mounted on left and right sides of the vehicle so that the inclination angle of the gently slant groove with respect to the circumferential direction is gradually increased from a tread end located in the inside of the vehicle or the vicinity thereof toward the other tread end, or the inclination angle of the gently slant groove with respect to the circumferential direction is gradually increased from a tread end located in the outside of the vehicle or the vicinity thereof toward the other tread end in accordance with suspension properties and the like of the vehicle as previously mentioned.

Generally, in order to enhance the drainage performance of the tire running on wet road surface, it is effective to arrange grooves extending in a direction perpendicular to the longitudinal direction at the ground contact surface of the tire. For example, when the ground contacting shape of the tire is long in the longitudinal direction as in 82 series tire or the like, it is effective to enhance the drainage performance of the tire by providing grooves extending in the lateral direction. However when the ground contacting shape of the tire is short in the longitudinal direction and long in the lateral direction as in low-section profile tire, it is effective to enhance the drainage performance of the tire by arranging grooves extending in the circumferential direction.

The ground contacting shape during cornering is rendered into substantially a trapezoidal form due to the change of loading, which is constructed with a major side and minor side.

In the major side, the gently slant groove extending at a relatively large inclination angle with respect to the circumferential direction is effective for raising the drainage performance in the lateral direction toward the ground contacting side. Since the ground contact pressure is high in the major side, it is required to enhance rigidity in the cornering. In the tire according to the invention, the block is defined by the gently slant grooves extending at a relatively large inclination angle with respect to the circumferential direction and the steeply slant grooves extending at a relatively small inclination angle with respect to the circumferential direction, and has a high rigidity. Further, drainage in the lateral direction toward the ground contacting side is mainly conducted in the major side, so that the groove width of the steeply slant groove extending at a relatively small inclination angle with respect to the circumferential direction can be made narrower and hence the lateral rigidity of the block becomes larger.

In the minor side, the ground contact pressure is low, so that it is required to make the blocks small for improving the ground contacting property. For this purpose, it is desirable that the block width between adjoining grooves is made small by making the inclination angle of the gently slant groove with respect to the circumferential direction relatively small in the minor side than that in the major side. In the tire according to the invention, the blocks are defined by inclining the gently slant grooves extending at a relatively large inclination angle with respect to the circumferential direction and the steeply slant grooves extending at a relatively small inclination angle with respect to the circumferential direction in different directions and crossing them with each other, whereby the edge of the block is not made acute and hence the uneven wear can be controlled. Since the drainage in the circumferential direction is mainly conducted in the minor side, it is desirable to widen the groove width of the steeply slant groove extending at a relatively small angle with respect to the circumferential direction.

Further, the gently slant grooves are substantially parallel with each other over the entirety of the ground contacting shape, so that acceleration traction in the cornering is improved by an edge effect of the block on wet road surface having a low friction coefficient.

Figure 1:
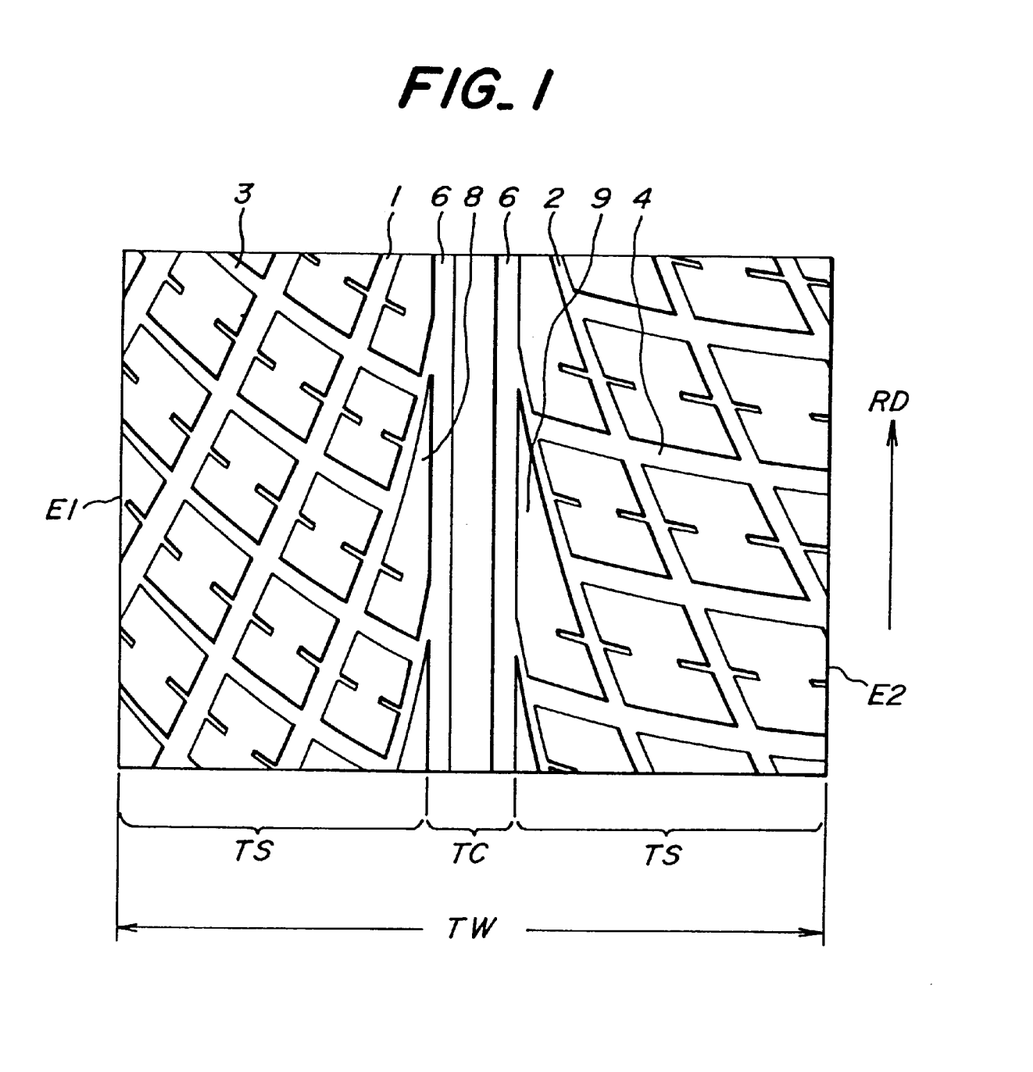
FIG. 1 is a partially enlarged front view of a first embodiment of the tread pattern in the pneumatic tire according to the invention.

FIG. 1 is a partially enlarged front view of a tread pattern in a racing tire for front wheel according to a first embodiment of the invention, in which a tire size is 22.5×9.5–13 and a tread width TW is 240 mm.

In the tire according to the invention shown in FIG. 1, the tread is comprised of a central region TC having a width corresponding to 12% of the tread width TW and side regions TS located at both sides of the central region TC. In each of the side regions TS are formed many blocks at intervals in the circumferential direction of the tire by plural kinds of slant grooves 1, 2, 3, 4 arranged at intervals in the circumferential direction, while two circumferential grooves 6 continuously extending in the circumferential direction are arranged in the central region TC.

These slant grooves are steeply slant grooves 1, 2 extending at a relatively small inclination angle of 10–25 degree with respect to the circumferential direction, and gently slant grooves 3, 4 extending at a relatively large inclination angle of 45–85 degree with respect to the circumferential direction.

The steeply slant grooves 1, 2 are steeply directional slant grooves 1, 2 arranged on both side regions TS and extending left and right in herringbone form with the central region TC between and opening to both tread ends, whereby there is formed so-called directional tread pattern defining a rotating direction (normal rotating direction) RD of the tire in the mounting on a vehicle so that sides of the steeply directional slant grooves 1, 2 near the central region TC contact with ground ahead and sides thereof apart from the central region TC contact with ground afterward.

On the other hand, the gently slant grooves 3, 4 are asymmetrically arranged on both side regions TS to extend from one E1 of the tread ends or the vicinity thereof toward the other tread end E2 while gradually increasing the inclination angle with respect to the circumferential direction from 45 degrees to 85 degrees and open to the other tread end E2. Since the rotating direction (normal rotating direction) RD of the tire is defined as shown in FIG. 1, the sides of the gently slant grooves 3, 4 having a small inclination angle with respect to the circumferential direction contact with ground ahead, and the sides thereof having a large inclination angle with respect to the circumferential direction contact with ground afterward. In other words, the opening end of the gently slant groove 3 located at the tread end E1 is first contacted with ground, and the opening end of the gently slant groove 4 located at the tread end E2 is lastly contacted with the ground.

In the illustrated tire, the steeply slant grooves 1, 2 extend left and right in the herringbone form with the central region TC between while gradually increasing the inclination angle with respect to the circumferential direction from 10 degrees to 25 degrees and the groove width thereof toward both tread ends E1, E2. Moreover, the groove widths of the steeply slant grooves 1, 2 are asymmetric in the left and right of the tread, in which the groove width of the steeply slant groove 1 gradually increases from 4 mm to 9.5 mm and the groove width of the steeply slant groove 2 gradually increases from 3 mm to 7 mm.

On the other hand, the gently slant groove 3 extends from the tread end E1 or the vicinity thereof toward the central region TC while gradually increasing the inclination angle with respect to the circumferential direction from 45 degrees to 65 degrees and the groove width from 2 mm to 7 mm. Subsequently the gently slant groove 4 extends from the central region TC toward the tread end E2 while gradually increasing the inclination angle with respect to the circumferential direction from 75 degrees to 85 degrees at a groove width of 8 mm. In other words, the gently slant grooves 3, 4 extend from the tread end E1 or the vicinity thereof toward the other tread end E2 while gradually increasing the inclination angle with respect to the circumferential direction from 45 degrees to 85 degrees and the groove width from 2 mm to 8 mm.

Blocks 8, 9 having substantially a triangular shape defined by the circumferential grooves 6, steeply slant grooves 1, 2 and gently slant grooves 3, 4 are arranged on both sides of the central region TC adjacent to the central region TC. Surfaces of acute corner parts of the substantially triangular-shaped blocks 8, 9 are chamfered over a zone ranging from a tapered end to about 20 mm in a longitudinal direction of the block to gradually shallow from the tapered end of the block toward a widened width part thereof. In the tire of the first embodiment, the wear resistance of the tire and the drainage performance in the running on wet road surface are improved by chamfering the surfaces of the acute corner parts of the blocks 8, 9.

Figure 2:
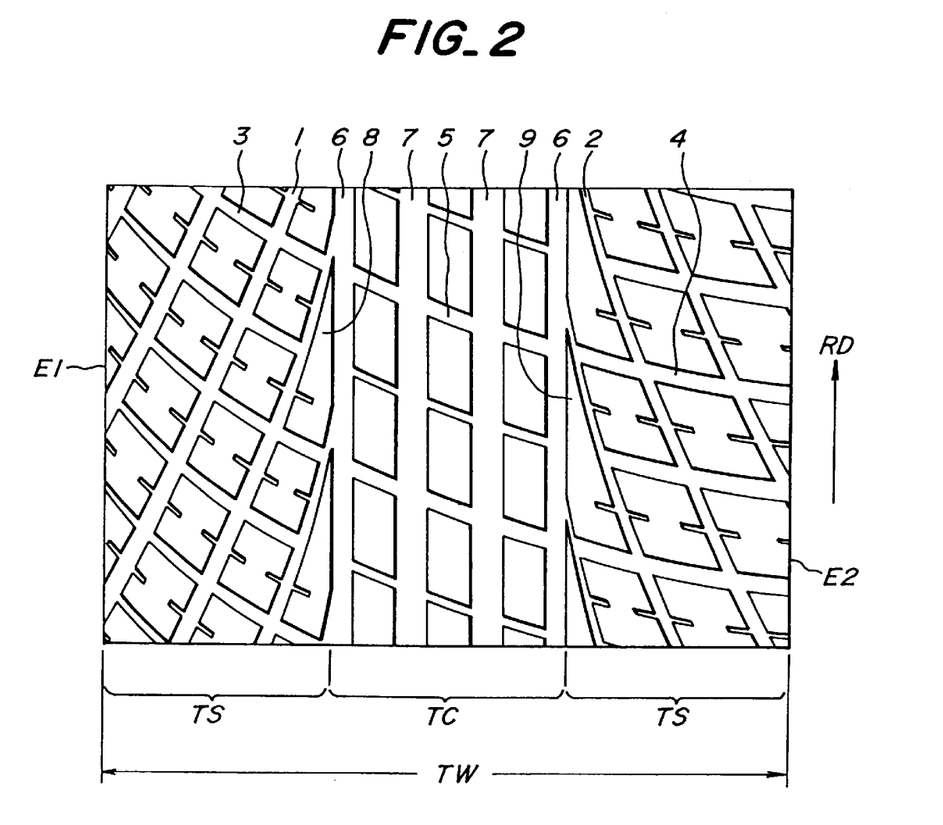
FIG. 2 is a partially enlarged front view of a second embodiment of the tread pattern in the pneumatic tire according to the invention.

FIG. 2 is a partially enlarged front view of a tread pattern in a racing tire for rear wheel according to a second embodiment of the invention, in which a tire size is 26.0× 13.0–13 and a tread width TW is 320 mm.

In the tire according to the invention shown in FIG. 2, the tread is comprised of a central region TC corresponding to 34% of the tread width TW and side regions TS located at both sides of the central region TC. In each of the side regions TS are formed many blocks at intervals in the circumferential direction of the tire by plural types of slant grooves 1, 2, 3, 4 arranged at intervals in the circumferential direction, while slant grooves 5 and four circumferential grooves 6, 7 continuously extending in the circumferential direction are arranged in the central region TC.

These slant grooves are steeply slant grooves 1, 2 extending at a relatively small inclination angle of 10–25 degrees with respect to the circumferential direction, and gently slant grooves 3, 4, 5 extending at a relatively large inclination angle of 45–85 degrees with respect to the circumferential direction.

The steeply slant grooves 1, 2 are steeply directional slant grooves 1, 2 arranged on both side regions TS and extending left and right in herringbone form with the central region TC between and opening to both tread ends, whereby there is formed so-called directional tread pattern defining a rotating direction (normal rotating direction) RD of the tire in the mounting on a vehicle so that sides of the steeply directional slant grooves 1, 2 near to the central region TC contact with ground ahead and sides thereof apart from the central region TC contact with ground afterward.

On the other hand, the gently slant grooves 3, 4 are asymmetrically arranged on both side regions TS and the gently slant groove 5 is arranged on the central region TC to extend from a tread end E1 or the vicinity thereof toward the other tread end E2 while gradually increasing the inclination angle with respect to the circumferential direction from 45 degrees to 85 degrees and open to the other tread end E2. Since the rotating direction (normal rotating direction) RD of the tire is defined as shown in FIG. 2, the sides of the gently slant grooves 3, 4, 5 having a small inclination angle with respect to the circumferential direction contact with ground ahead, and the sides thereof having a large inclination angle with respect to the circumferential direction contact with ground afterward. In other words, the gently slant groove 3 near to the tread end E1 is first contacted with ground, and the opening end of the gently slant groove 4 located at the tread end E2 is lastly contacted with ground.

In the illustrated tire, the steeply slant grooves 1, 2 extend left and right in the herringbone form with the central region TC between while gradually increasing the inclination angle with respect to the circumferential direction from 10 degrees to 25 degrees and the groove width thereof toward both tread ends E1, E2. Moreover, the groove widths of the steeply slant grooves 1, 2 are asymmetric in the left and right of the tread, in which the groove width of the steeply slant groove 1 gradually increases from 4 mm to 9.5 mm and the groove width of the steeply slant groove 2 gradually increases from 3 mm to 7 mm.

On the other hand, the gently slant groove 3 extends from the tread end E1 or the vicinity thereof toward the central region TC in one of the side regions TS while gradually increasing the inclination angle with respect to the circumferential direction from 45 degrees to 65 degrees and the groove width from 2 mm to 7 mm, and further the gently slant groove 5 extends in the central region TC while gradually increasing the inclination angle with respect to the circumferential direction from 65 degrees to 75 degrees at a groove width of 8 mm, and subsequently the gently slant groove 4 extends from the central region TC toward the tread end E2 in the other side region TS while gradually increasing the inclination angle with respect to the circumferential direction from 75 degrees to 85 degrees at a groove width of 8 mm. In other words, the gently slant grooves 3, 4, 5 extend from the tread end E1 or the vicinity thereof toward the other tread end E2 while gradually increasing the inclination angle with respect to the circumferential direction from 45 degrees to 85 degrees and the groove width from 2 mm to 8 mm.

Figure 3A:
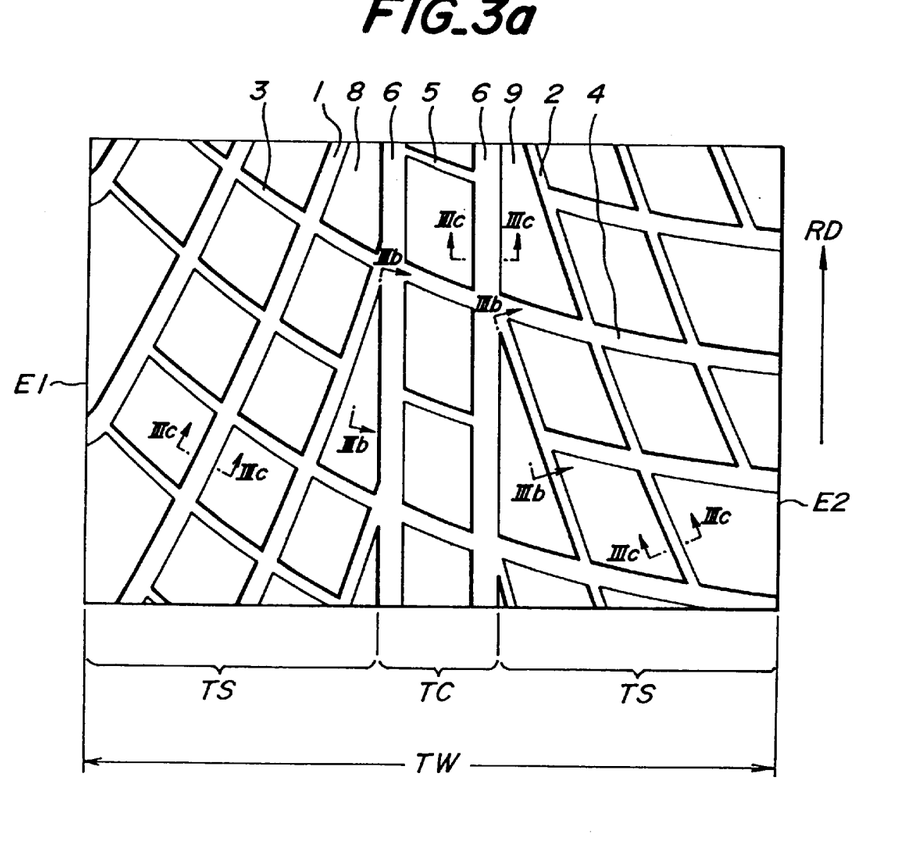
FIG. 3a is a partially enlarged front view of a third embodiment of the tread pattern in the pneumatic tire according to the invention.

FIG. 3 is a partially enlarged front view of a tread pattern in a racing tire for front wheel according to a third embodiment of the invention, in which a tire size is 245/50R13 and a tread width TW is 240 mm.

In the tire according to the invention shown in FIG. 3, the tread is comprised of a central region TC having a width corresponding to 20% of the tread width TW and side regions TS located at both sides of the central region TC. In each of the side regions TS are formed many blocks at intervals in the circumferential direction of the tire by plural kinds of slant grooves 1, 2, 3, 4 arranged at intervals in the circumferential direction, while a plurality of slant grooves 5 arranged at given intervals in the circumferential direction of the tire and two circumferential grooves 6 continuously extending in the circumferential direction are arranged in the central region TC.

These slant grooves are steeply slant grooves 1, 2 extending at a relatively small inclination angle of 15–25 degrees with respect to the circumferential direction, and gently slant grooves 3, 4, 5 extending at a relatively large inclination angle of 45–80 degrees with respect to the circumferential direction.

The steeply slant grooves 1, 2 are steeply directional slant grooves 1, 2 arranged on both side regions TS and extending left and right in herringbone form with the central region TC between and opening to both tread ends, whereby there is formed so-called directional tread pattern defining a rotating direction (normal rotating direction) RD of the tire in the mounting on a vehicle so that sides of the steeply directional slant grooves 1, 2 near to the central region TC contact with ground ahead and sides thereof apart from the central region TC contact with ground afterward.

On the other hand, the gently slant grooves 3, 4 are asymmetrically arranged on both side regions TS and the gently slant grooves 5 are arranged on the central region TC to extend from one E1 of the tread ends or the vicinity thereof toward the other tread end E2 while gradually increasing the inclination angle with respect to the circumferential direction from 45 degrees to 85 degrees and open to the other tread end E2. Since the rotating direction (normal rotating direction) RD of the tire is defined as shown in FIG. 1, the sides of the gently slant grooves 3, 4, 5 having a small inclination angle with respect to the circumferential direction contact with ground ahead, and the sides thereof having a large inclination angle with respect to the circumferential direction contact with ground afterward. In other words, the gently slant groove 3 near to the tread end E1 is first contacted with ground, and the opening end of the gently slant groove 4 located at the tread end E2 is lastly contacted with ground.

In the illustrated tire, the steeply slant grooves 1, 2 extend left and right in the herringbone form with the central region TC between while gradually increasing the inclination angle with respect to the circumferential direction from 15 degrees to 25 degrees and the groove width thereof toward both tread ends E1, E2. Moreover, the groove widths of the steeply slant grooves 1, 2 are asymmetric in the left and right of the tread, in which the groove width of the steeply slant groove 1 gradually increases from 5 mm to 8 mm and the groove width of the steeply slant groove 2 gradually increases from 4 mm to 5 mm.

On the other hand, the gently slant groove 3 extends in one of the side regions TS from the tread end E1 or the vicinity thereof toward the central region TC while gradually increasing the inclination angle with respect to the circumferential direction from 45 degrees to 60 degrees and the groove width from 3 mm to 4 mm, and further the gently slant groove 5 extends in the central region TC while gradually increasing the inclination angle with respect to the circumferential direction from 70 degrees to 75 degrees at a groove width of 7 mm, and subsequently the gently slant groove 4 extends in the other side region TS from the central region TC toward the tread end E2 while gradually increasing the inclination angle with respect to the circumferential direction from 75 degrees to 80 degrees at a groove width of 8 mm.

In other words, the gently slant grooves 3, 4, 5 extend from the tread end E1 or the vicinity thereof toward the other tread end E2 while gradually increasing the inclination angle with respect to the circumferential direction from 45 degrees to 80 degrees and the groove width from 3 mm to 8 mm.

Figure 3B:
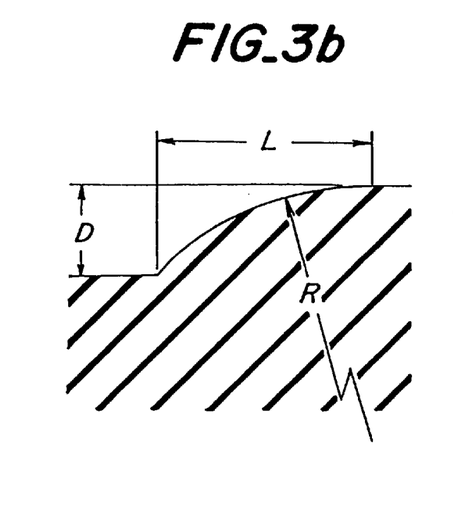
FIGS. 3b and 3c are sectional views taken along lines IIIb—IIIb and IIIc—IIIc in FIG. 3a, respectively.

Blocks 8, 9 having substantially a triangular shape defined by the circumferential grooves 6, steeply slant grooves 1, 2 and gently slant grooves 3, 4 are arranged on both sides of the central region TC adjacent to the central region TC. Surfaces of acute corner parts of the substantially triangular-shaped blocks 8, 9 are chamfered over L=15 mm ranging from a tapered end in a longitudinal direction of the block at a radius of curvature of R=20 mm to gradually shallow from the tapered end of the block toward a widened width part thereof as shown in FIG. 3b. The groove depth D is 6 mm.

Figure 3C:
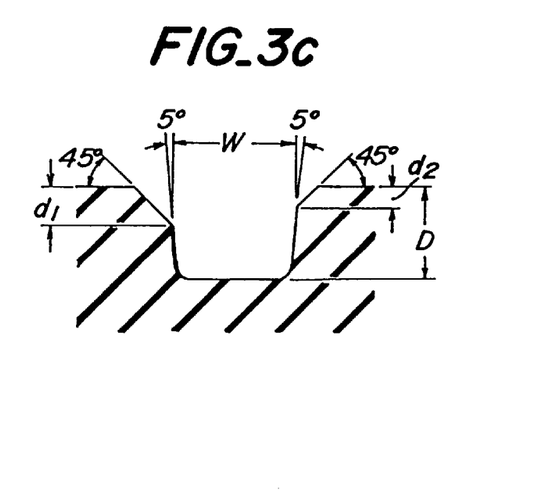

As shown in FIG. 3c, the edge of the groove wall in the steeply slant grooves 1, 2 and the circumferential groove 6 is chamfered to form so-called two-stage groove that the angle of the groove wall at left and right with respect to a normal line drawn on the tread is 45 degrees outward in the radial direction and 5 degrees inward in the radial direction. The groove depth D is 6 mm, and the chamfered depth d1 at the left-hand side is 2,4 mm corresponding to 40% of the groove depth D, and the chamfered depth d2 at the right-hand side is 1.2 mm corresponding to 20% of the groove depth D. The value of the groove width w differs in the grooves 1, 2, 6, 7 and in the position as to the steeply slant grooves 1, 2.

Figure 4A:
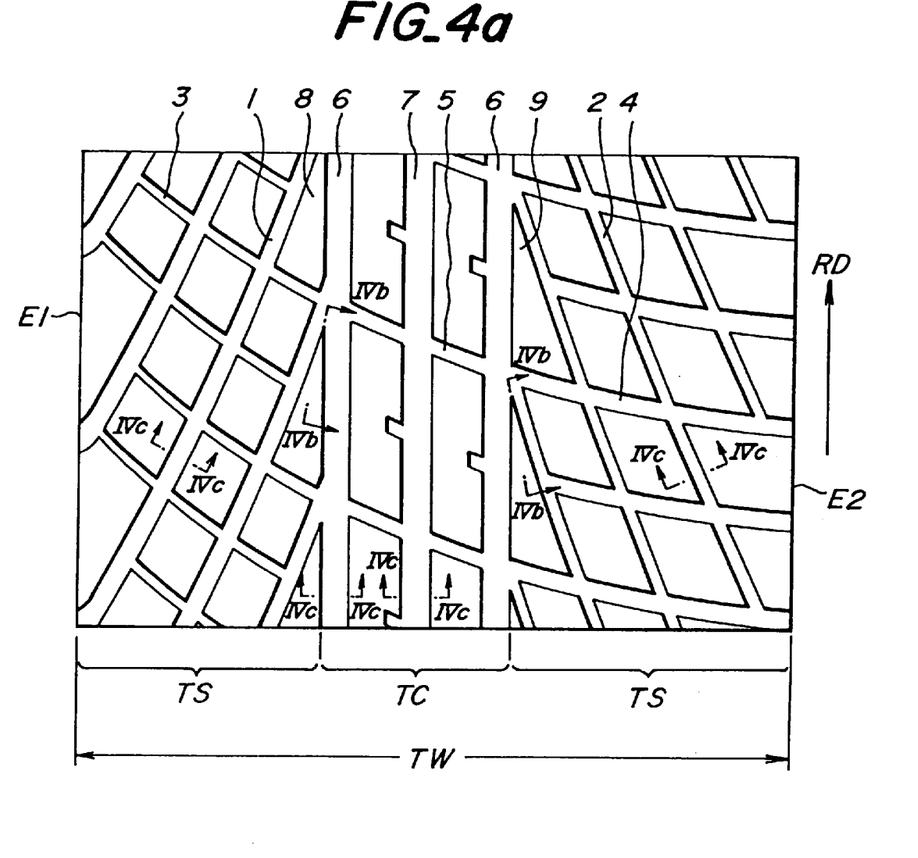
FIG. 4a is a partially enlarged front view of a fourth embodiment of the tread pattern in the pneumatic tire according to the invention.

FIG. 4 is a partially enlarged front view of a tread pattern in a racing tire for rear wheel according to a fourth embodiment of the invention, in which a tire size is 315/45R13 and a tread width TW is 315 mm.

In the tire according to the invention shown in FIG. 4, the tread is comprised of a central region TC corresponding to 22% of the tread width TW and side regions TS located at both sides of the central region TC. In each of the side regions TS are formed many blocks at intervals in the circumferential direction of the tire by plural kinds of slant grooves 1, 2, 3, 4 arranged at intervals in the circumferential direction, while slant grooves 5 and three circumferential grooves 6, 7 continuously extending in the circumferential direction are arranged in the central region TC.

These slant grooves are steeply slant grooves 1, 2 extending at a relatively small inclination angle of 15–25 degrees with respect to the circumferential direction, and gently slant grooves 3, 4, 5 extending at a relatively large inclination angle of 45–85 degrees with respect to the circumferential direction.

The steeply slant grooves 1, 2 are steeply directional slant grooves 1, 2 arranged on both side regions TS and extending left and right in herringbone form with the central region TC between and opening to both tread ends, whereby there is formed so-called directional tread pattern defining a rotating direction (normal rotating direction) RD of the tire in the mounting on a vehicle so that sides of the steeply directional slant grooves 1, 2 near to the central region TC contact with ground ahead and sides thereof apart from the central region TC contact with ground afterward.

On the other hand, the gently slant grooves 3, 4 are asymmetrically arranged on both side regions TS and the gently slant groove 5 is arranged on the central region TC to extend from a tread end E1 or the vicinity thereof toward the other tread end E2 while gradually increasing the inclination angle with respect to the circumferential direction from 45 degrees to 85 degrees and open to the other tread end E2. Since the rotating direction (normal rotating direction) RD of the tire is defined as shown in FIG. 2, the sides of the gently slant grooves 3, 4, 5 having a small inclination angle with respect to the circumferential direction contact with ground ahead, and the sides thereof having a large inclination angle with respect to the circumferential direction contact with ground afterward. In other words, the gently slant groove 3 near to the tread end E1 is first contacted with ground, and the opening end of the gently slant groove 4 located at the tread end E2 is lastly contacted with ground.

In the illustrated tire, the steeply slant grooves 1, 2 extend left and right in the herringbone form with the central region TC between while gradually increasing the inclination angle with respect to the circumferential direction from 15 degree to 25 degree and the groove width thereof toward both tread ends E1, E2. Moreover, the groove widths of the steeply slant grooves 1, 2 are asymmetric in the left and right of the tread, in which the groove width of the steeply slant groove 1 gradually increases from 8 mm to 10 mm and the groove width of the steeply slant groove 2 gradually increases from 5 mm to 6 mm.

On the other hand, the gently slant groove 3 extends from the tread end E1 or the vicinity thereof toward the central region TC in one of the side regions TS while gradually increasing the inclination angle with respect to the circumferential direction from 45 degrees to 60 degrees and the groove width from 3 mm to 6 mm, and further the gently slant groove 5 extends in the central region TC while gradually increasing the inclination angle with respect to the circumferential direction from 65 degrees to 70 degrees at a groove width of 7 mm, and subsequently the gently slant groove 4 extends from the central region TC toward the tread end E2 in the other side region TS while gradually increasing the inclination angle with respect to the circumferential direction from 75 degrees to 85 degrees and the groove width from 8 mm to 9 mm. In other words, the gently slant grooves 3, 4, 5 extend from the tread end E1 or the vicinity thereof toward the other tread end E2 while gradually increasing the inclination angle with respect to the circumferential direction from 45 degrees to 85 degrees and the groove width from 3 mm to 9 mm.

Figure 4B:
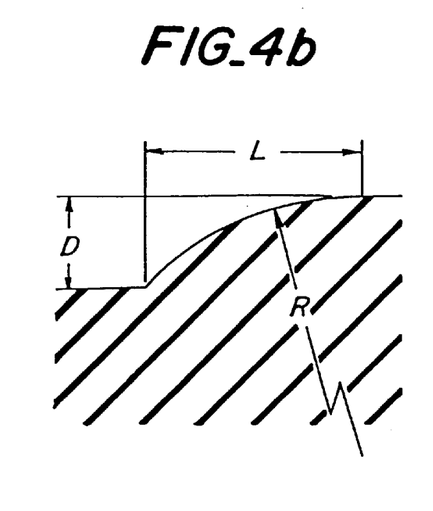
FIGS. 4b and 4c are sectional views taken along lines IVb—IVb and IVc—Ivc in FIG. 4a, respectively.

Blocks 8, 9 having substantially a triangular shape defined by the circumferential grooves 6, steeply slant grooves 1, 2 and gently slant grooves 3, 4 are arranged on both sides of the central region TC adjacent to the central region TC. Surfaces of acute corner parts of the substantially triangular-shaped blocks 8, 9 are chamfered over L=15 mm ranging from a tapered end in a longitudinal direction of the block at a radius of curvature of R=20 mm so as to gradually shallow from the tapered end of the block toward a widened width part thereof as shown in FIG. 4b. The groove depth D is 6 mm.

Figure 4C:
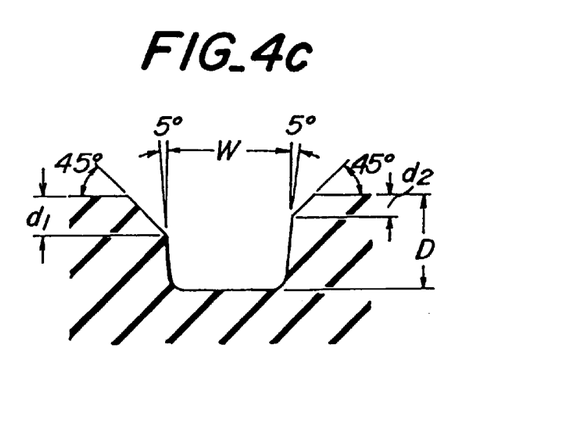

As shown in FIG. 4c, the edge of the groove wall in the steeply slant grooves 1, 2 and the circumferential grooves 6, 7 is chamfered so as to form so-called two-stage groove that the angle of the groove wall at left and right with respect to a normal line drawn on the tread is 45 degrees outward in the radial direction and 5 degree inward in the radial direction. The groove depth D is 6 mm, and the chamfered depth d1 at the left-hand side is 2,4 mm corresponding to 40% of the groove depth D, and the chamfered depth d2 at the right-hand side is 1.2 mm corresponding to 20% of the groove depth D. The value of the groove width w differs in the grooves 1, 2, 6, 7 and in the position as to the steeply slant grooves 1, 2.

FIG. 5 is a partially enlarged front view of a tread pattern in the conventional racing tire for front wheel, and FIG. 6 is a partially enlarged front view of a tread pattern in the conventional racing tire for rear wheel.

The conventional tires shown in FIGS. 5 and 6 have many blocks defined by four (front tire) or seven (rear tire) circumferential grooves 13, many slant grooves 11 and slant fine grooves 12, respectively.

A test for evaluating resistance to hydroplaning in straight running and cornering is carried out with respect to a racing car provided with the tires according to the invention shown in FIGS. 1 and 2 and a racing car provided with the conventional tires shown in FIGS. 5 and 6, respectively.

The resistance to hydroplaning in straight running is evaluated by measuring a generation limit speed of hydroplaning through a driver's feeling when the racing car is straight-forward run on a wet road surface having a water depth of 5 mm, while the resistance to hydroplaning in the cornering is evaluated by measuring a lateral limit gravity when the racing car is run on a wet curved road surface having a water depth of 5 mm and a radius of 80 m.

As a result of the above test, the resistance to hydroplaning in the straight running and the cornering in the tire according to the invention is 120 and 125, respectively, on the basis that the conventional tire is 100.

As seen from the above, the pneumatic tire according to the invention is a pneumatic racing tire having improved resistance to hydroplaning in the straight running and cornering.

What is claimed is:

1. A pneumatic tire having an asymmetric directional tread pattern in which a tread is constituted with a central region having a width corresponding to about $1/10$–$1/3$ of a tread width and side regions located at both sides of the central region and a plurality of blocks are formed in a tread at intervals in a circumferential direction of the tire by plural kinds of slant grooves arranged on at least the side regions at intervals in the circumferential direction of the tire, the improvement wherein (1) the slant grooves comprise steeply slant grooves each extending at a relatively small inclination angle with respect to the circumferential direction and gently slant grooves each extending at a relatively large inclination angle with respect to the circumferential direction, (2) the steeply slant grooves are arranged on both side regions and are steeply directional slant grooves extending right and left in herringbone form with the central region between and open to both ends of the tread, (3) the steeply directional slant grooves form a directional tread pattern defining a rotating direction (normal rotating direction) of the tire when the tire is mounted on a vehicle so as to contact a side of a steeply directional slant groove near to the central region with ground ahead and contact a side of the steeply directional slant groove apart from the central region with ground afterward, and (4) the gently slant grooves are asymmetrically arranged on at least both side regions with respect to a pattern center and extend from one of both tread ends or a vicinity thereof toward the other tread end, the gently slant grooves being open to the other tread end and having an inclination angle with respect to the circumferential direction which gradually increases from the one of both tread ends or the vicinity thereof to the other tread end and wherein the gently slant grooves when mounted on a vehicle contact a side of a gently slant groove having a small inclination angle with respect to the circumferential direction with the ground ahead and contact a side of a gently slant groove having a large inclination angle with respect to the circumferential direction with the ground afterwards wherein 1–4 circumferential grooves extending in the circumferential direction or substantially continuously in the circumferential direction are arranged in the central region and wherein substantially triangular shaped blocks are arranged on both sides of the central region, each triangular shaped block being defined by a circumferential groove, a steeply slant groove and a gently slant groove.

2. A pneumatic tire according to claim 1, wherein each steeply slant groove extends at an inclination angle of 5–35 degrees with respect to the circumferential direction.

3. A pneumatic tire according to claim 2, wherein on each side region the steeply slant grooves are inclined at an inclination angle with respect to the circumferential direction which gradually increases toward the tread end.

4. A pneumatic tire according to claim 2, wherein on each side region the steeply slant grooves have a groove width which gradually increases toward the tread end.

5. A pneumatic tire according to claim 1, wherein each gently slant groove extends at an inclination angle of not less than 45 degrees but less than 90 degrees with respect to the circumferential direction.

6. A pneumatic tire according to claim 5, wherein each gently slant groove extends from one of both tread ends or a vicinity thereof toward the other tread end and both the inclination angle of the gently slant grooves with respect to the circumferential direction and the groove width of the gently slant grooves gradually increase.

7. A pneumatic tire according to claim 5, wherein each gently slant groove is arranged in the central region and both side regions and continuously extends from one of both tread ends or a vicinity thereof toward the other tread end and the inclination angle of the gently slant grooves with respect to the circumferential direction gradually increases.

8. A pair of pneumatic tires for a vehicle comprising a first pneumatic tire and a second pneumatic tire, each of said first pneumatic tire and said second pneumatic tire having an asymmetric directional tread pattern in which a tread is constituted with a central region having a width corresponding to about $1/10$–$1/3$ of a tread width and side regions located at both sides of the central region and a plurality of blocks are formed in a tread at intervals in a circumferential direction of the tire by plural kinds of slant grooves arranged on at least the side regions at intervals in the circumferential direction of the tire, the improvement wherein (1) the slant grooves comprise steeply slant grooves each extending at a relatively small inclination angle with respect to the circumferential direction and gently slant grooves each extending at a relatively large inclination angle with respect to the circumferential direction, (2) the steeply slant grooves are arranged on both side regions and are steeply directional slant grooves extending right and left in herringbone form with the central region between and open to both ends of the tread, (3) the steeply directional slant grooves form a directional tread pattern defining a rotating direction (normal rotating direction) of the tire when the tire is mounted on a vehicle so as to contact a side of a steeply directional slant groove near to the central region with ground ahead and contact a side of the steeply directional slant groove apart from the central region with ground afterward, and (4) the gently slant grooves are asymmetrically arranged on at least both side regions with respect to a pattern center and extend from one of both tread ends or a vicinity thereof toward the other tread end, the gently slant grooves being open to the other tread end and having an inclination angle with respect to the circumferential direction which gradually increases from the one of both tread ends or the vicinity thereof to the other tread end and wherein the gently slant grooves when mounted on a vehicle contact a side of a gently slant groove having a small inclination angle with respect to the circumferential direction with the ground ahead and contact a side of a gently slant groove having a large inclination angle with respect to the circumferential direction with the ground afterwards wherein 1–4 circumferential grooves extending in the circumferential direction or substantially continuously in the circumferential direction are arranged in the central region and wherein substantially triangular shaped blocks are arranged on both sides of the central region, each triangular shaped block being defined by a circumferential groove, a steeply slant groove and a gently slant groove wherein when the first pneumatic tire and the second pneumatic tire are mounted on the vehicle, the first pneumatic tire is mounted on a left side of the vehicle and the second pneumatic tire is mounted on a right side of the vehicle so that the inclination angle of the gently slant grooves with respect to the circumferential direction is either gradually increased from a tread end located at an inside of the vehicle or a vicinity thereof to the other tread end or gradually increased from a tread end located at an outside of the vehicle or a vicinity thereof to the other tread end.

* * * * *